(12) United States Patent
    Dewa

(10) Patent No.: US 10,262,072 B2
(45) Date of Patent:     Apr. 16, 2019

(54) RECEPTION DEVICE, INFORMATION PROCESSING METHOD IN RECEPTION DEVICE, TRANSMISSION DEVICE, INFORMATION PROCESSING DEVICE, AND INFORMATION PROCESSING METHOD

(71) Applicant: SONY CORPORATION, Tokyo (JP)

(72) Inventor: Yoshiharu Dewa, Tokyo (JP)

(73) Assignee: SONY CORPORATION, Tokyo (JP)

( * ) Notice: Subject to any disclaimer, the term of this patent is extended or adjusted under 35 U.S.C. 154(b) by 720 days.

(21) Appl. No.: 14/763,689

(22) PCT Filed: Apr. 16, 2014

(86) PCT No.: PCT/JP2014/060874
    § 371 (c)(1),
    (2) Date: Jul. 27, 2015

(87) PCT Pub. No.: WO2014/175148
    PCT Pub. Date: Oct. 30, 2014

(65) Prior Publication Data
    US 2015/0363505 A1     Dec. 17, 2015

(30) Foreign Application Priority Data
    Apr. 26, 2013    (JP) .................. 2013-093436

(51) Int. Cl.
    *G06F 17/20*    (2006.01)
    *G06F 17/30*    (2006.01)
    (Continued)

(52) U.S. Cl.
    CPC ........ *G06F 17/30896* (2013.01); *H04L 65/60* (2013.01); *H04N 21/8586* (2013.01); *H04N 21/4782* (2013.01)

(58) Field of Classification Search
    CPC ........ G06F 17/30905; G06F 17/30896; H04N 21/8586
    See application file for complete search history.

(56) References Cited

U.S. PATENT DOCUMENTS 6,781,609 B1 *  8/2004  Barker .................... G06F 9/451
                                                            715/760
8,713,420 B2 *  4/2014  Lund .................. H04N 21/4307
                                                            715/203
(Continued)

FOREIGN PATENT DOCUMENTS

JP        2011-65489 A      3/2011

OTHER PUBLICATIONS

International Search Report dated May 20, 2014 in PCT/JP2014/060874.

(Continued)

*Primary Examiner* — Mohammed H Zuberi
(74) *Attorney, Agent, or Firm* — Oblon, McClelland, Maier & Neustadt, L.L.P.

(57) ABSTRACT

It is possible to access a presentation control information (HTML document) element contained in a transport media stream from an HTML application side.
A first HTML document for displaying a web page is received. In addition, the transport media stream which contains a predetermined number of transport media and a second HTML document as the presentation control information of the transport media is received. A DOM tree of the first HTML document is generated. When a video element that references the transport media stream is present in the first HTML document, the DOM tree that is generated according to the second HTML document contained in the transport media stream is linked beneath a node of the video element.

16 Claims, 13 Drawing Sheets

EXAMPLE OF DOM TREE LINKING

(51) Int. Cl.
*H04N 21/858* (2011.01)
*H04L 29/06* (2006.01)
*H04N 21/4782* (2011.01)

(56) References Cited

U.S. PATENT DOCUMENTS

| | | | | |
|---|---|---|---|---|
| 8,913,068 | B1* | 12/2014 | Kokkevis | G06F 17/30058 345/522 |
| 2002/0120790 | A1* | 8/2002 | Schwalb | H04N 21/235 719/328 |
| 2010/0306643 | A1* | 12/2010 | Chabot | G06F 17/30861 715/234 |
| 2014/0237536 | A1* | 8/2014 | Jang | H04N 21/43 725/131 |
| 2015/0296231 | A1* | 10/2015 | Kwon | H04N 21/2362 725/116 |
| 2015/0363505 | A1* | 12/2015 | Dewa | G06F 17/30896 715/234 |
| 2016/0267879 | A1* | 9/2016 | Champel | H04N 5/44591 |

OTHER PUBLICATIONS

IPTV Standard, "HTML5 Browser Specification", IPTVFJ STD-0011 Version 1.0, Mar. 22, 2013, 181 page, <URL: http://www.iptvforum.jp/info/2012/03291507.html>.
IPTV Standard, "Integrated Broadcast-Broadband System Specification", IPTVFJ STD-0010 Version 1.0, Mar. 22, 2013, 254 pages, <URL: http://www.iptvforum.jp/info/2012/03291507.html>.
Shuichi Aoki et al., "A Study on Hybrid Delivery of Content Realized with MMT", The 75th National Convention of Information Processing Society of Japan, Mar. 6, 2013, 12 pages.

* cited by examiner

BASIC STRUCTURE OF MMT-CI

FIG. 7

```
<!DOCTYPE html>
<html xmlns="http://www.w3.org/1999/xhtml" >
<head>
<title>Fullscreen video</title>
<MMT-CI:view id="View1" style="position:absolute; width:1920px; height:1080px" MMT-CI:begin="0s" MMT-CI:end="indefinite">
    <MMT-CI:divLocation id="divL1" style="position:absolute; left:0px; top:0px; width:1440px; height:1080px" MMT-CI:begin="0s" MMT-CI:end="indefinite" MMT-CI:refDiv="Area1"/>
    <MMT-CI:divLocation id="divL2" style="position:absolute; left:1440px; top:0px; width:480px; height:1080px" MMT-CI:begin="0s" MMT-CI:end="indefinite" MMT-CI:refDiv="Area2"/>
</MMT-CI:view>
</head>
<body>
<div id="Area1" style="position:absolute; width:1920px; height:1080px">
    <video id="Video1" src="mmt://asset1.m2v" style="position:absolute; left:0px; top:0px; width:1920px; height:1080px" MMT-CI:begin="0s"/>
    <audio id="audio1" src="mmt://asset2.mp3" MMT-CI:begin="0s"/>
</div>
<div id="Area2" style="position:absolute; width:1920px; height:270px">
    <img id="Image1" src="mmt://asset3.jpg" style="position:absolute; left:0px; top:0px; width:1920px; height:270px" MMT-CI:begin="0s" MMT-CI:end="18:00"/>
    <img id="Image2" src="mmt://asset4.jpg" style="position:absolute; left:0px; top:0px; width:1920px; height:270px" MMT-CI:begin="Image1.end"/>
</div>
</body>
</html>
```

EXAMPLE OF DOM TREE OF CI

FIG. 9

```
<html>
<head>
    <title>sample of MMT access</title>
</head>
<body onload="start()">
    <div> <p>DISPLAY START TIME OF Image2:</p>
    <video id="v1" src="http://sample.mmt" / >
    </div>
<script>
<!--
function start()
{
var videoElm = document.getElementsByTagName('video')[0];
var mmtElm =videoElm.otherPlain[0].document.getElementsByTagName('view')[0];
var endtime = mmtElm.getElememtById('Image1').getAttributeNode("MMT-CI:end").nodeValue; // "18:00" IS ACQUIRED
var pelm = document.getElementsByTagName('p')[0];
pelm.innerText = pelm.innerText + endtime;
}
// -->
</script>
</body>
</html>
```

EXAMPLE OF DOM TREE OF HTML DOCUMENT

EXAMPLE OF DOM TREE LINKING

FIG. 13A sample.html

```
<html>
<head>
    <title>SAMPLE OF MMT ACCESS</title>
</head>
<body onload="start()">
    <div> <p>DISPLAY START TIME OF Image2:</p>
    <video id="v1" src="http://sample.mmt" />
    </div>
    <scriptsrc="sample.js"/>
</body>
</html>
```

FIG. 13B sample.js

```
function start()
{
    var videoElm = document.getElementsByTagName('video')[0];
    var mmtElm =videoElm.otherPlain[0].document.getElementsByTagName('view')[0];
    var endtime = mmtElm.getElememtById('Image1').getAttributeNode("MMT-CI:end"').nodeValue; // "18:00" IS ACQUIRED
    var pelm = document.getElementsByTagName('p')[0];
    pelm.innerText = pelm.innerText + endtime;
}
```

RECEPTION DEVICE, INFORMATION PROCESSING METHOD IN RECEPTION DEVICE, TRANSMISSION DEVICE, INFORMATION PROCESSING DEVICE, AND INFORMATION PROCESSING METHOD

TECHNICAL FIELD

The present technology relates to a reception device, an information processing method in the reception device, a transmission device, an information processing device, and an information processing method. Specifically, the present technology relates to a reception device or the like which receives and processes display control data such as an HTML document for displaying a web page.

BACKGROUND ART

Display of the web page is performed by a web browser. At this time, the web browser acquires an HTML document (an HTML file) from a web server, parses the HTML document to generate a Document Object Model (DOM) tree, generates various rendered elements based on the DOM tree and displays the web page (for example, refer to PTL 1).

The Document Object Model (DOM) is present in the World Wide Web Consortium (W3C) standards. The DOM defines a tree structure in which the outermost tag, <html>, is the top node in relation to one HTML document, and designates an interface for applying dynamic processing by JavaScript to each parameter of tags. Note that "JavaScript" is a registered trademark.

In recent years, a method defined in MPEG Media Transport (MMT) ISO/IEC 23008-1 is attracting attention as a transport method suitable for next generation broadcasting. MMT not only defines the transport layer, but also a data structure referred to as MMT Composition Information (MMT-CI) which describes the configuration of the screen or a change with time. The MMT-CI configures presentation control information of transport media such as video, audio, and images. The MMT-CI is defined by HTML 5.

CITATION LIST

Patent Literature

PTL 1: Japanese Unexamined Patent Application Publication No. 2011-065489

SUMMARY OF INVENTION

Technical Problem

There is a case in which a video (Video) element is present in an HTML 5 document from a web server. In this case, video display is performed according to the video element in a predetermined region of a web page screen that is displayed by a web browser. In this case, it is conceivable to reference an MMT transport media stream as a source of the video element.

The object of the present technology is to enable the access to a presentation control information (HTML document) element contained in the transport media stream from the HTML application side.

Solution to Problem

The concept of the present technology is a reception device which includes a first reception unit which receives a first HTML document for displaying a web page;

a second reception unit which receives a transport media stream containing a predetermined number of transport media and a second HTML document as presentation control information of the transport media; and a DOM tree generation unit which generates a DOM tree of the first HTML document that is received by the first reception unit, in which, when a video element that references the transport media stream is present in the first HTML document, the DOM tree generation unit links the DOM tree that is generated according to the second HTML document contained in the transport media stream beneath a node of the video element.

In the present technology, the first HTML document for displaying the web page is received by the first reception unit. In addition, the transport media stream is received by the second reception unit. The transport media stream contains the predetermined number of transport media and the second HTML document as the presentation control information of the transport media.

For example, the transport media stream may be a transport stream in which first transport packets containing a payload of the transport media, and second transport packets containing information relating to the transport media are time division multiplexed. In this case, the transport packets may be MMT packets, and the second HTML document may be an MMT-CI. For example, the second HTML document may be data having an HTML structure to which the data structure of MPEG2-TS is mapped.

The DOM tree of the first HTML document which is received by the first reception unit is generated by the DOM tree generation unit. When a video element that references the transport media stream is present in the first HTML document, the DOM tree that is generated according to the second HTML document contained in the transport media stream is linked beneath the node of the video element.

In the present technology, when generating the DOM tree of the first HTML document, the DOM tree that is generated according to the second HTML document is linked beneath the node of the video element. Therefore, it is possible to access a presentation control information (HTML document) element contained in the transport media stream from the HTML application side.

Note that, in the present technology, for example, an element acquisition unit which acquires a predetermined element of the second HTML document based on the DOM tree that is generated by the DOM tree generation unit may be further provided. In this case, for example, it is possible to acquire and use a predetermined element of the second HTML document in the HTML application side.

For example, a display control unit which controls display of the web page based on the DOM tree that is generated by the DOM tree generation unit may be further provided, and the display control unit may display information relating to presentation control of the predetermined number of transport media on a display screen of the web page based on the predetermined element of the second HTML document that is acquired by the element acquisition unit. In this case, for example, the user can ascertain the information relating to the presentation control of the predetermined number of transport media presented on the display screen of the web page.

In addition, for example, a program for accessing a specific element of the second HTML document may be contained in the first HTML document, and the element acquisition unit may acquire the specific element of the second HTML document based on the program. In this case, for example, it is possible to easily acquire a predetermined element of the second HTML document in the HTML application side.

In addition, for example, reference information for acquiring a program for accessing a specific element of the second HTML document may be contained in the first HTML document, and the element acquisition unit may acquire the specific element of the second HTML document based on the program that is acquired using the reference information. In this case, for example, it is possible to easily acquire a predetermined element of the second HTML document in the HTML application side.

In addition, another concept of the present technology is a transmission device which includes a holding portion which holds a first HTML document for displaying a web page which contains a video element that references a transport media stream containing a predetermined number of transport media and a second HTML document as presentation control information of the transport media, and which contains a program for accessing a specific element of the second HTML document or reference information for acquiring the program; and a transmission unit which transmits the first HTML document that is held.

In the present technology, the first HTML document for displaying a web page is held in the holding portion. The video element that references the transport media stream which contains the predetermined number of transport media and the second HTML document as the presentation control information of the transport media is contained in the first HTML document. In addition, the first HTML document contains a program for accessing a specific element of the second HTML document or reference information for acquiring the program. The first HTML document that is held is transmitted by the transmission unit.

For example, the transport media stream may be a transport stream in which first transport packets containing a payload of the transport media, and second transport packets containing information relating to the transport media are time division multiplexed. In this case, the transport packets may be MMT packets, and the second HTML document may be an MMT-CI.

In the present technology, the first HTML document for displaying a web page that is transmitted from the transmission unit contains a program for accessing a specific element of the second HTML document contained in the transport media stream or reference information for acquiring the program. Therefore, it is possible to easily acquire a predetermined element of the second HTML document in the HTML application side in the reception unit.

In addition, another concept of the present technology is an information processing device which includes a data acquisition unit which acquires a first HTML document for displaying a web page; and a DOM tree generation unit which parses the first HTML document that is acquired by the data acquisition unit and generates a DOM tree in which a plurality of elements are associated with each other, in which, when a video element that references a transport media stream containing a predetermined number of transport media and a second HTML document as presentation control information of the transport media is present in the first HTML document, the DOM tree generation unit links the DOM tree that is generated according to the second HTML document contained in the transport media stream beneath the video element.

In the present technology, the first HTML document for displaying a web page is acquired by the data acquisition unit. The first HTML document that is acquired by the data acquisition unit is parsed, and a DOM tree in which a plurality of elements are associated with each other is generated by the DOM tree generation unit.

In this case, when a video element that references the transport media stream that contains a predetermined number of transport media and the second HTML document as the presentation control information of the transport media is present in the first HTML document, the DOM tree that is generated according to the second HTML document contained in the transport media stream is linked beneath the video element.

In the present technology, the DOM tree that is generated according to the second HTML document is linked beneath the node of the video element of the DOM tree of the first HTML document. Therefore, it is possible to access a presentation control information (HTML document) element contained in a transport media stream from the HTML application side.

In addition, another concept of the present technology is an information processing device which includes a data acquisition unit which acquires first display control data containing a plurality of structural units that define information relating to display control; and a structured data generation unit which parses the first display control data that is acquired by the data acquisition unit and generates structured data in which the plurality of structural units are associated with each other, in which, when a predetermined structural unit that references a transport media stream containing a predetermined number of transport media and second display control data containing a plurality of the structural units that define presentation control information of the transport media is present in the first display control data, the structured data generation unit links the structured data that is generated according to the second display control data contained in the transport media stream beneath the predetermined structural unit.

Advantageous Effects of Invention

According to the present technology, for example, it is possible to access the content of the presentation control information (HTML document) contained in the transport media stream from the HTML application side. Note that, the effects disclosed in the present specification are merely examples, embodiments are not to be limited thereto and additional effects may be present.

BRIEF DESCRIPTION OF DRAWINGS

FIG. 7 is a diagram illustrating an example of an MMT-CI.

FIG. 9 is a diagram illustrating an example of an HTML document.

FIGS. 13A, 13B are diagrams illustrating an example of an HTML document containing reference information of a program (a script) for accessing a specific element of an MMT-CI, and an example of a script file containing the program (the script) for accessing a specific element of the MMT-CI.

DESCRIPTION OF EMBODIMENTS

Hereafter, description will be given of embodiments for realizing the invention (below, "embodiments"). Note that, the description will be given in the following order.
1. Embodiment
2. Modification Example 1. Embodiment

[Configuration Example of Display System]

Figure 1:
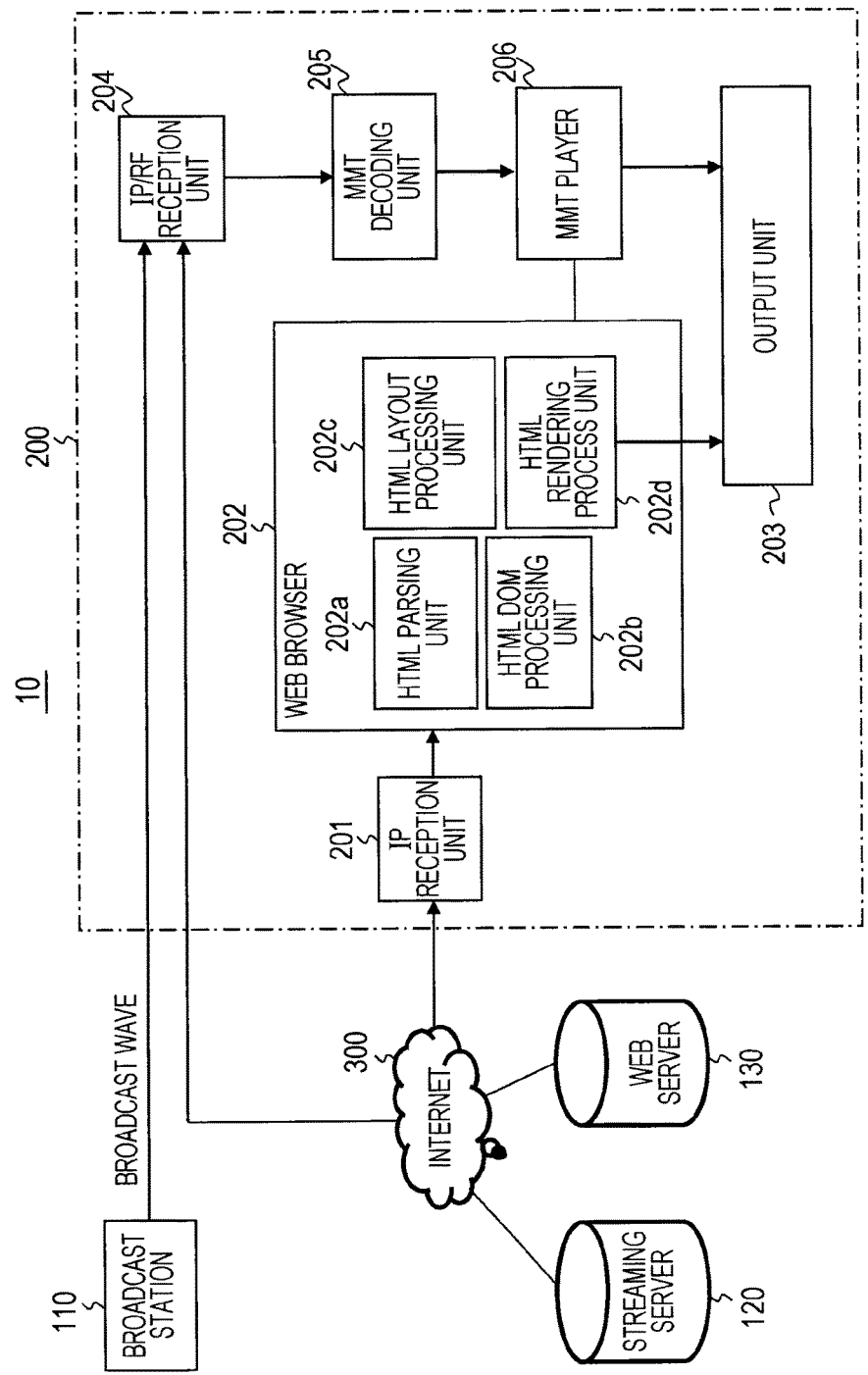
FIG. 1 is a block diagram illustrating a configuration example of a display system as an embodiment.

FIG. 1 illustrates a configuration example of a display system 10. In the display system 10, a broadcasting station 110, a streaming server 120, and a web (Web) server 130 are disposed on a transmission side, and a receiver 200 is disposed on a reception side.

The broadcasting station 110 generates transport packets of the MMT structure (refer to ISO/IEC CD 23008-1), that is, a transport media stream in which MMT packets are contained, and transmits the transport media stream to the reception side through an RF transmission channel. Hereinafter, the transport media stream will be referred to as the "MMT stream", as appropriate. In this case, the broadcasting station 110 RF modulates the MMT stream via an appropriate application layer or the like and subsequently transmits the MMT stream to the reception side through the RF transmission channel.

The streaming server 120 transmits an MMT stream which is the same as that handled by the broadcasting station 110 described above to the reception side through, for example, a communication network transmission channel such as an Internet 300. In this case, the streaming server 120 converts the MMT stream into IP packets and transmits the IP packets to the reception side through the communication network transmission channel.

First MMT packets containing a payload of transport media such as video and audio, and second MMT packets containing a payload of information relating to the transport media are time division multiplexed in the MMT stream, at least by the size of fragmented packets. A data structure referred to as MMT Composition Information (MMT-CI) which describes the configuration of the screen or a change with time is defined as one type of information relating to the transport media. The MMT-CI configures presentation control information of transport media such as video, audio, and images. The MMT-CI is defined by HTML 5.

Figure 2:
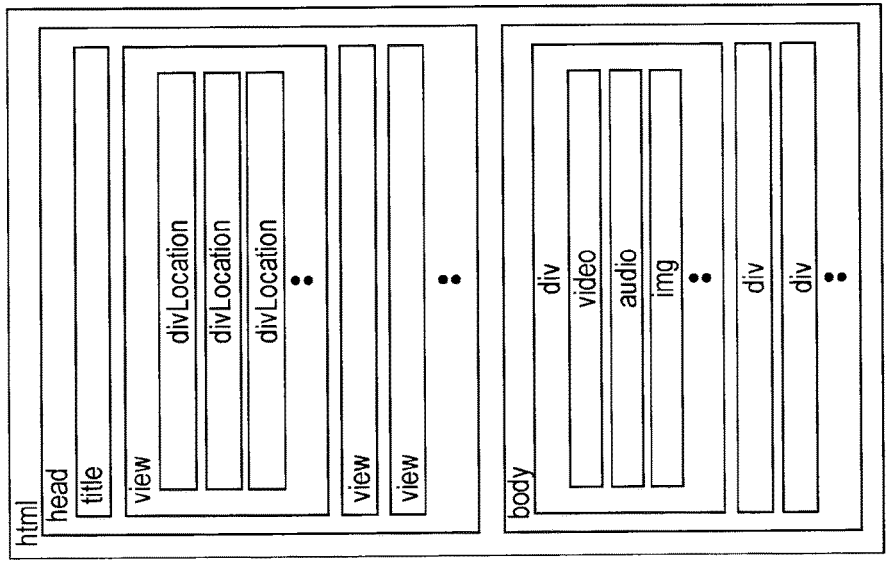
FIG. 2 is a diagram illustrating the basic structure of an MMT-CI.

FIG. 2 illustrates the basic structure of an MMT-CI. A root element is "html", and has a head element and a body element. The head element has a plurality of view elements in addition to a title element, and each of the view elements has a plurality of divLocation elements. In addition, the body element has a plurality of div elements. It is possible to place video (video), audio (audio), image (img), and the like inside the div elements. A source element or a src attribute is used for specifying each medium. The view element determines the display position of a div of the body; however, the initial position is determined by the divLocation element therebelow. The divLocation elements sequentially indicate the display position that changes in time-series manner. Therefore, the display position changes according to the divLocation elements without the page reloading.

Returning to FIG. 1, the web server 130 holds HTML 5 documents (HTML files) for displaying web pages (an HTML 5 application) in a holding portion such as storage. In response to a request from the reception side, the web server 130 transmits an HTML 5 document that is being held in the holding portion to the reception side through a communication network transmission channel such as the Internet 300 using an IP transmission unit. It is well known that the presence of a video (video) element is permitted in HTML 5. For example, there is a case in which a video element is present in an HTML 5 document that is transmitted from the web server 130 to the reception side, and the source of the video element is in an MMT stream. In this case, reference information for referencing an MMT stream is present as the video element.

The receiver 200 includes an IP reception unit 201, a web (Web) browser 202, an output unit 203, an IP/RF reception unit 204, an MMT decoding unit 205, and an MMT player 206. The IP/RF reception unit 204 receives an MMT stream that is transmitted thereto through an RF transmission channel from the broadcasting station 110 after the MMT stream is parsed in the application layer. Alternatively, the IP/RF reception unit 204 receives an MMT stream that is transmitted thereto from the web server 130 through a communication network transmission channel.

The MMT decoding unit 205 subjects the MMT packets contained in the MMT stream that is received by the IP/RF reception unit 204 to unpacketting and a decoding process, obtains data such as video, audio, and images as media data, and also obtains meta-data and messages. In this case, the MMT-CI which describes the configuration of the screen or a change with time is also obtained. The MMT decoding unit 205 also performs the generation of the Document Object Model (DOM) tree of the MMT-CI.

The MMT player 206 generates output data of images and audio according to the configuration (the layout) of the screen, the change with time or the like specified by the MMT-CI based on data such as video, audio, and images obtained by the MMT decoding unit 205.

The output unit 203 performs image display and audio output based on the output data of images and audio generated by the MMT player 206, or the output data of images and audio generated by the web browser 202. The output unit is configured by a display which performs the image display, a speaker which performs audio output, or the like.

The IP reception unit 201 receives an HTML 5 document (an HTML file) that is transmitted thereto from the web server 130 through a communication network transmission channel such as the Internet 300. The web browser 202 parses the HTML 5 document that is received by the IP reception unit 201, generates a DOM tree, and generates the output data of images and audio based on the DOM tree and the like.

The web browser 202 includes an HTML parsing unit 202*a* which parses the HTML 5 document, and an HTML DOM processing unit 202*b* which generates a DOM tree based on the parsed results. In addition, the web browser 202 includes an HTML layout processing unit 202*c* and an HTML rendering process unit 202*d* which perform a layout process and a rendering process based on the DOM tree or the like and generate the output data of images and audio.

In the embodiment, when a video (video) element which references an MMT stream is present in the HTML 5 document, the HTML DOM processing unit 202*b* links the DOM tree of the MMT-CI that is generated by the MMT decoding unit 205 as described above beneath the node of the video element. By performing the linking of the DOM trees in this manner, it becomes possible to access the elements of the MMT-CI from the HTML application side that is handled by the web browser 202.

Figure 3:
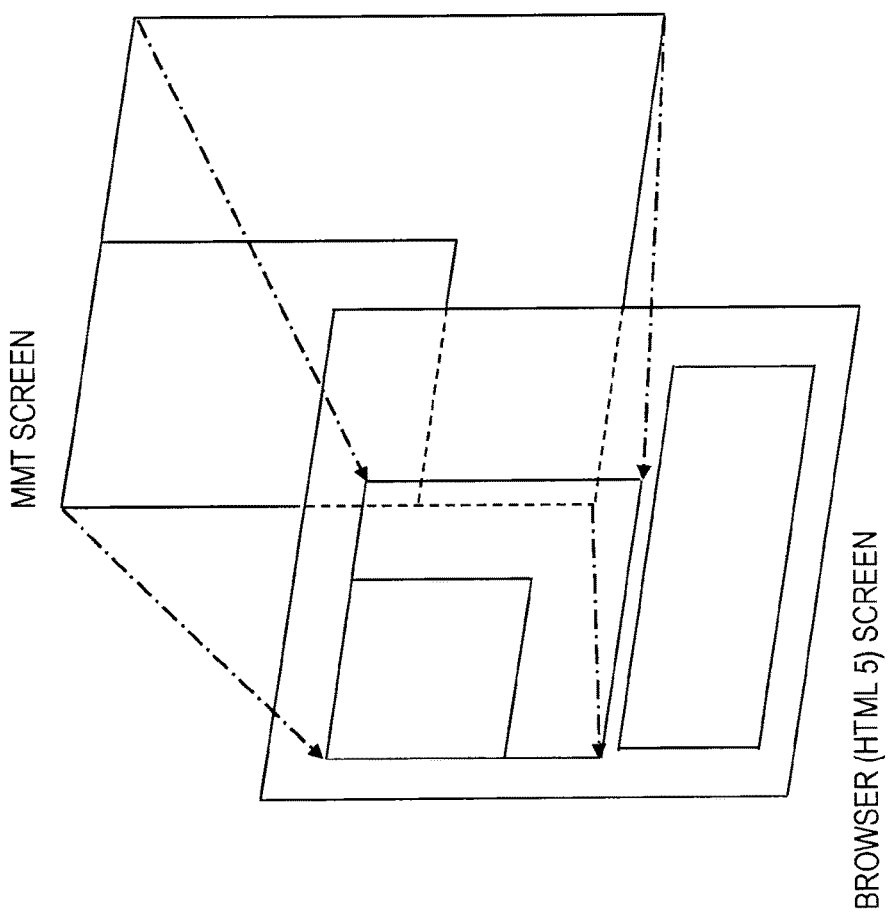
FIG. 3 is a diagram illustrating the relationship between a browser screen and an MMT screen when a video (Video) element that references an MMT stream is present in an HTML 5 document.

FIG. 3 illustrates the relationship between a browser screen (HTML 5) and an MMT screen when a video (video) element that references an MMT stream is present in the HTML 5 document. In this case, the MMT screen enters a state of being inserted into a portion of the browser screen. Here, the size adjustment and the like when inserting the MMT screen into a portion of the browser screen is performed by the HTML rendering process unit 202*d* of the web browser 202.

Figure 4:
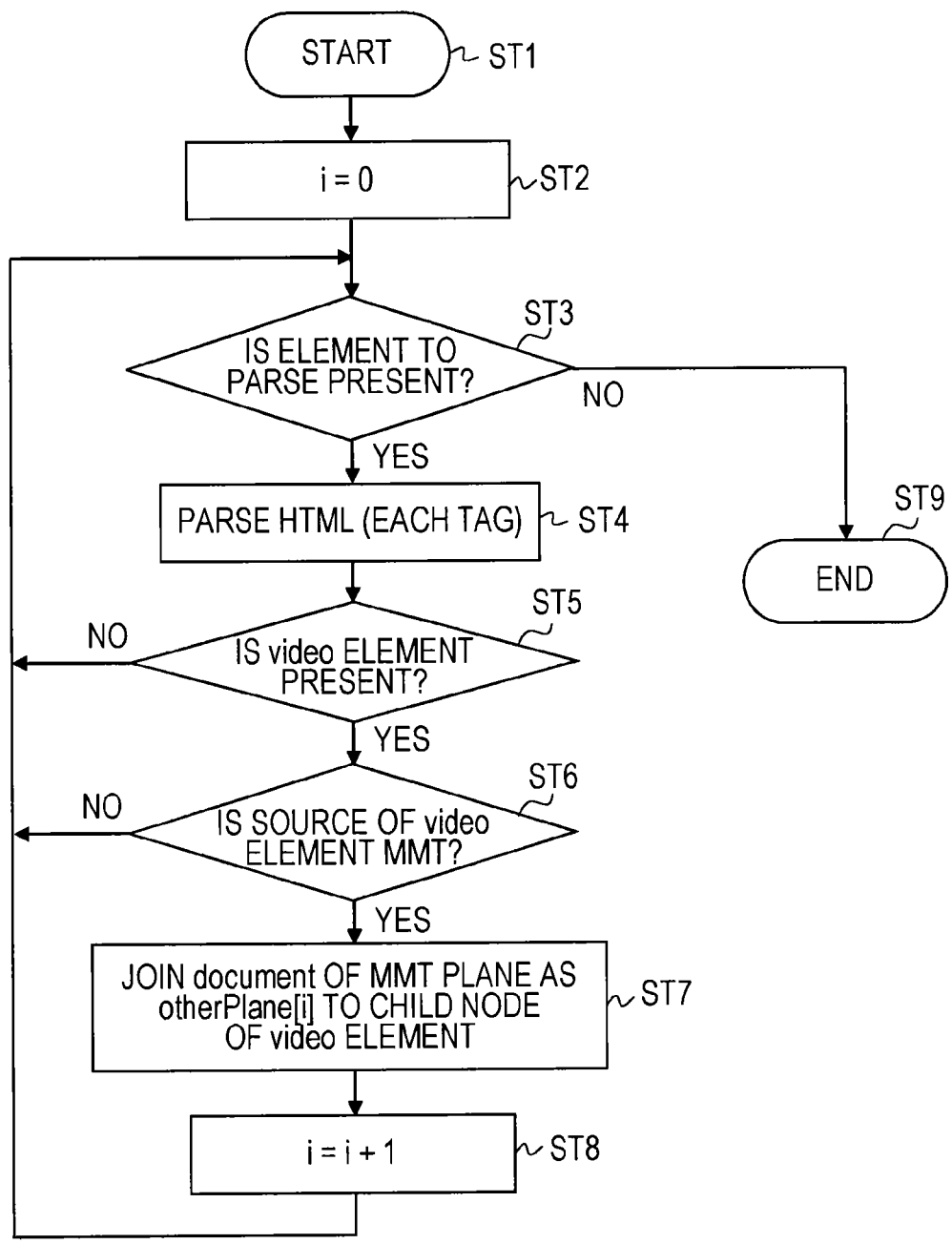
FIG. 4 is a flowchart illustrating an example of a DOM tree generation process in an HTML DOM processing unit of a web browser.

FIG. 4 illustrates an example of a DOM tree generation process in the HTML DOM processing unit 202*b* of the web browser 202. The HTML DOM processing unit 202*b* starts the DOM tree generation process in step ST1, and subsequently sets i=0 in step ST2.

Next, the HTML DOM processing unit 202*b* determines whether or not an element to parse is present in the HTML document in step ST3. When an element to parse is present, the HTML DOM processing unit 202*b* parses an element of the HTML document for each tag in step ST4.

Next, the HTML DOM processing unit 202*b* determines whether or not a video element is present in the elements of the parsed HTML document in step ST5. When a video element is present in the elements, the HTML DOM processing unit 202*b* determines whether or not the source is an MMT stream in step ST6.

When the source is an MMT stream, the HTML DOM processing unit 202*b* links the DOM tree of the MMT-CI beneath the node of the video element in step ST7. In other words, the HTML DOM processing unit 202*b* joins the document of the DOM tree of the MMT plane, which serves as otherPlane[i], to the child node of the video element.

Next, the HTML DOM processing unit 202*b* increments the value of i in step ST8, subsequently returns to the process of step ST3, and repeats the same processes as described above. Note that, when no video element is present in step ST5, and when the source of the video element is not an MMT stream in step ST6, the process immediately returns to the process of step ST3. In addition, when all the elements of the HTML document are parsed and there are no elements to parse in step ST3, the HTML DOM processing unit 202*b* proceeds to step ST9 and completes the DOM tree generation process.

Figure 5:
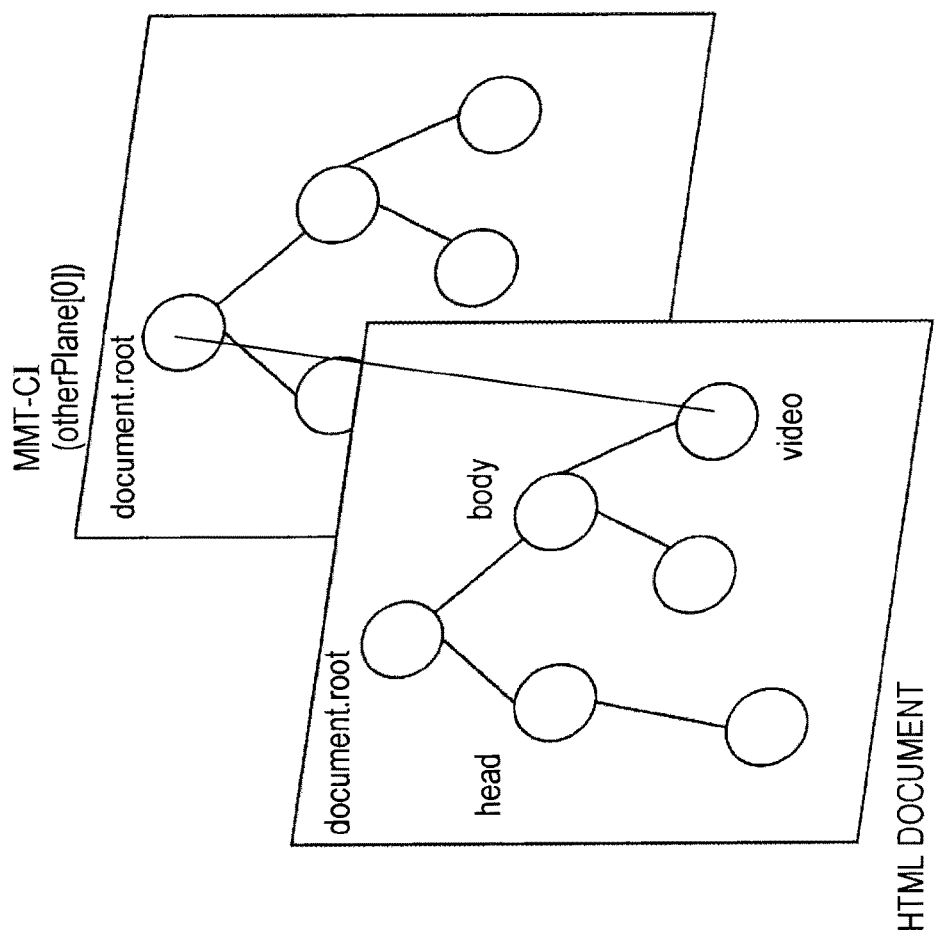
FIG. 5 is a diagram illustrating an example of the mutual relationship between the DOM tree of an HTML document and the DOM tree of an MMT-CI linked thereto.

FIG. 5 illustrates an example of the mutual relationship between the DOM tree of an HTML document and the DOM tree of an MMT-CI linked thereto. Using these DOM trees, it is possible to access each element of the HTML document and each element of the MMT-CI.

For example, it is possible to perform the access to the video element of the HTML document using a script (script) such as that shown below.

```
var videoElm =
    document.getElementsByTagName('video')[0];
```

Alternatively, if an id is attached to the video element, it is possible to perform the access to the video element of the HTML document using a script such as that shown below.

```
var videoElm =
    document.getElementByID("v1");
```

In addition, it is possible to perform the access to each element of the MMT-CI, for example, a view element using a script such as that shown below. This script is an example of a case in which the view element of the MMT-CI is accessed from the video element of the HTML document.

```
var mmtElm =
    videoElm.otherPlane[0].document.getElementsByTagName('view')
    [0];
```

In addition, relative access to the view element of the MMT-CI from the top of the HTML document is also conceivable. An example of a script in this case is shown below.

```
var mmtElm =
    document.firstChild.firstChild.childNode [1].otherPlane
    [0].document.getElementsByTagName('view')[0];
```

Note that, since the DOM of the MMT-CI is appropriately updated in time series, when the DOM of the MMT-CI is re-written dynamically from the HTML application, integrity cannot be maintained. Therefore, it is necessary to use read only (read only). In other words, all of the DOM access from otherPlane onward is set to read only (read only).

Figure 6:
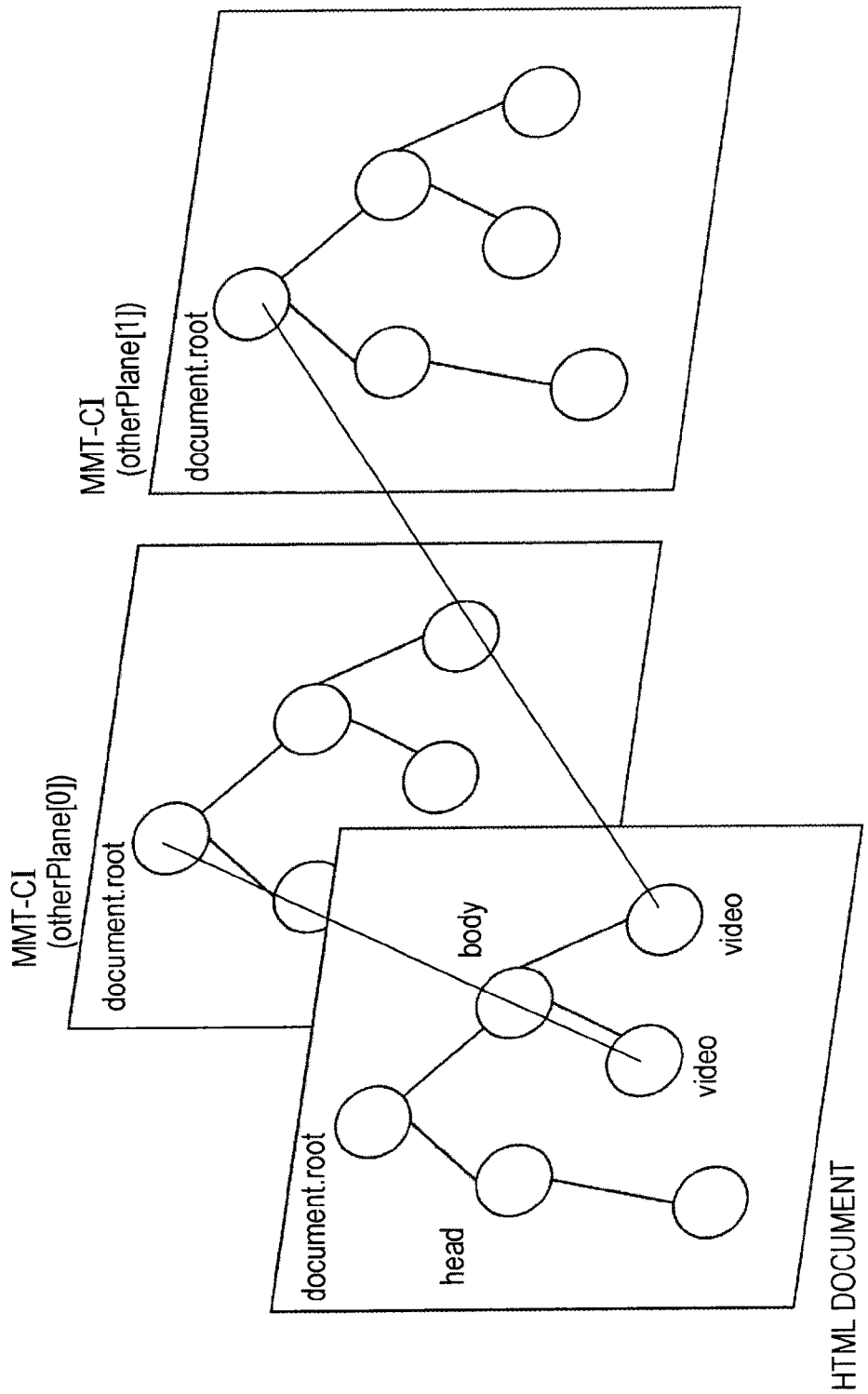
FIG. 6 is a diagram illustrating an example of the mutual relationship between the DOM tree of an HTML document and the DOM trees of two MMT-CIs linked thereto.

FIG. 6 is a diagram illustrating an example of the mutual relationship between the DOM tree of an HTML document and the DOM trees of two MMT-CIs linked thereto. Using these DOM trees, it is possible to access each element of the HTML document and each element of the two MMT-CIs.

For example, it is possible to perform the access to the view element of the MMT-CI of the DOM tree (otherPlane[i]) using a script (script) such as that shown below.

```
var mmtElm =
    document.firstChild.firstChild.childNode
    [1].otherPlane[1].document.getElementsByTagName('view')[0];
```

Figure 8:
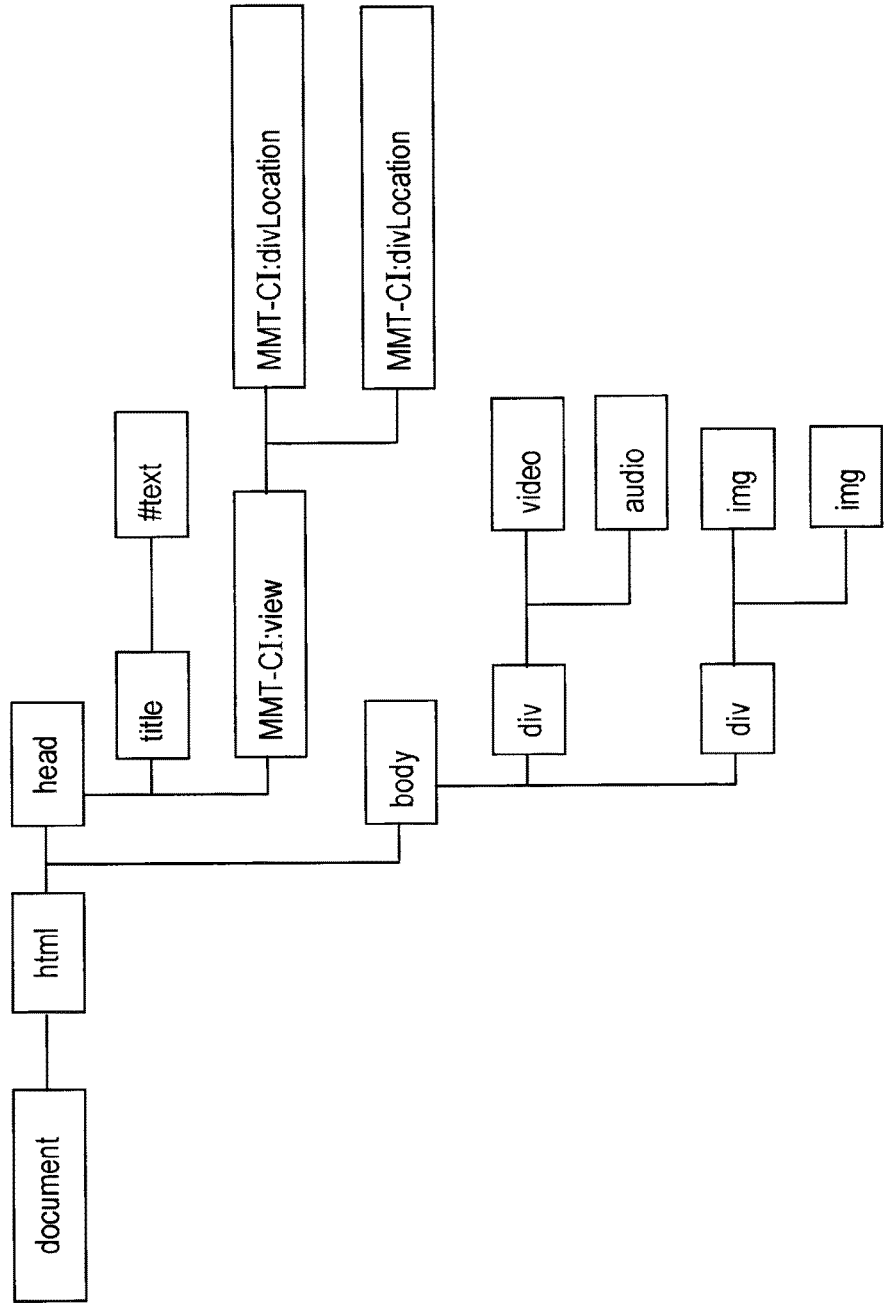
FIG. 8 is a diagram illustrating an example of the DOM tree of an MMT-CI.

FIG. 7 is a diagram illustrating an example of an MMT-CI. The html element has a head element and a body element. The head element has a title element and a view element. Textual data indicating the title is present in the title element. The view element has two divLocation elements. In addition, the body element has two div elements. One div element has a video element and an audio element, and the other div element has two img elements. FIG. 8 illustrates an example of the DOM tree of an MMT-CI.

FIG. 9 illustrates an example of an HTML document. The html element has a head element and a body element. The head element has a title element. Textual data indicating the title is present in the title element. In addition, the body element has a div element and a script element. The div element has a p element and a video element. Textual data indicating "display start time of image2" is present in the p element. Reference information of the MMT stream "src="http://sample.mmt"" is present as the video element.

A script for accessing various elements and acquiring the elements is present as the script element. Here, "var videoElm=document.getElementsByTagName('video') [0];" is a script for accessing the video element of the HTML document. In addition, "var mmtElm=videoElm.otherPlain [0].document.getElementsByTagName('view') [0];" is a script for accessing the view element of the MMT-CI from the video element of the HTML document.

Furthermore, "var endtime=mmtElm.getElememtById ('Image1').getAttributeNode("MMT-CI:end").nodeValue;" is a script for accessing the image1 element of the MMT-CI and acquiring the value of "end". It is possible to acquire "18:00", which is the value of the display end time, using the script.

In addition, "var pelm=document.getElementsByTagName('W')[0];" and "pelm.innerText=pelm.innerText+endtime;" are scripts for accessing the p element of the MMT-CI and acquiring the textual data indicating "display start time of image2".

Figure 10:
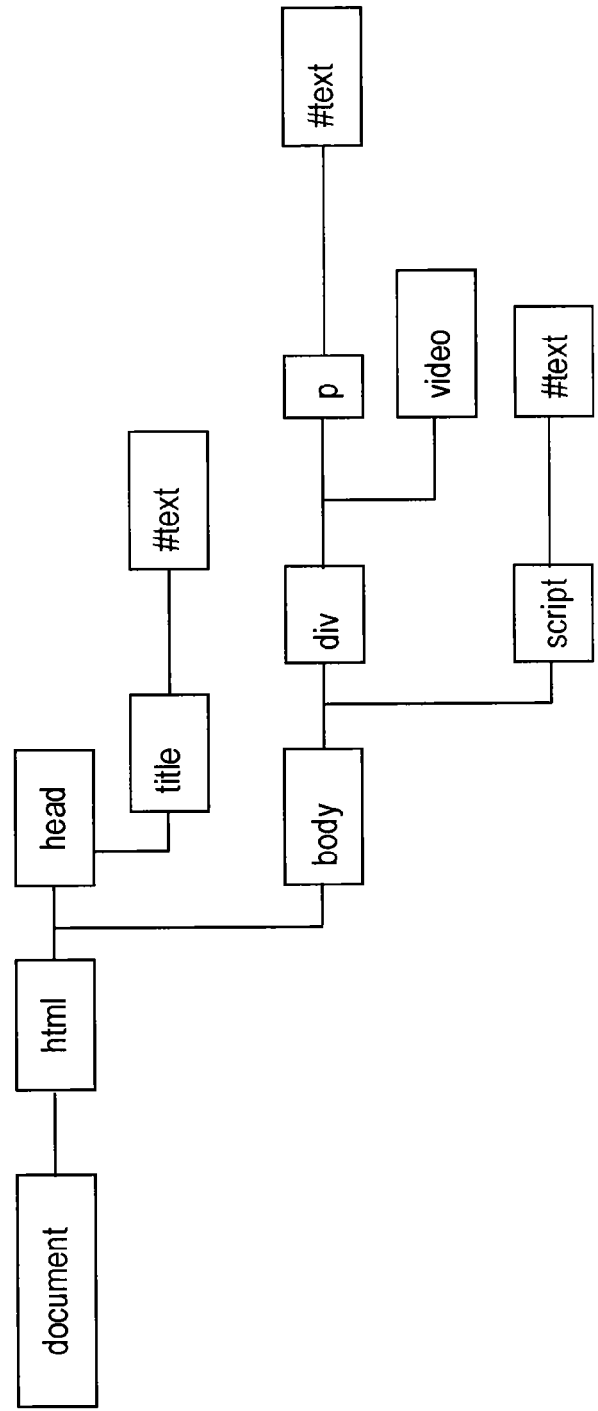
FIG. 10 is a diagram illustrating an example the DOM tree of an HTML document.
Figure 11:
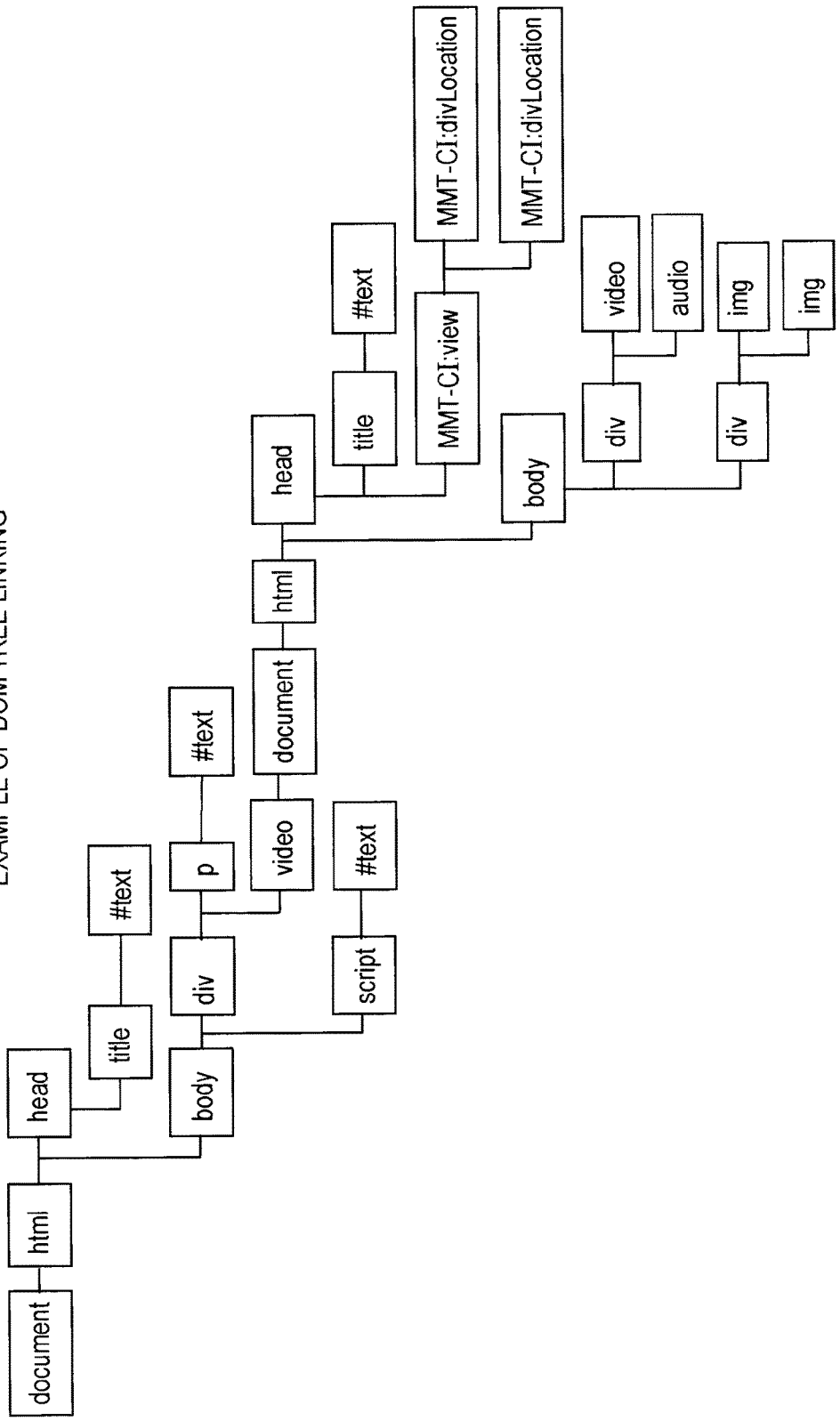
FIG. 11 is a diagram illustrating an example in which the DOM tree of an MMT-CI is linked beneath a video element of the DOM tree of an HTML document.

FIG. 10 illustrates an example the DOM tree of the HTML document. FIG. 11 illustrates an example in which the DOM tree of an MMT-CI is linked beneath the video element of the DOM tree of the HTML document.

A simple description will be given of the operations of the display system 10 illustrated in FIG. 1. The MMT stream is transmitted from the broadcasting station 110 to the reception side through the RF transmission channel. Alternatively, the MMT stream is transmitted from the streaming server 120 to the reception side through a communication network transmission channel such as the Internet 300.

The MMT stream that is transmitted from the broadcasting station 110 or the streaming server 120 is received by the IP/RF reception unit 204 of the receiver 200. The MMT stream is supplied to the MMT decoding unit 205. The MMT decoding unit 205 subjects the MMT packets contained in the MMT stream to unpacketting and a decoding process, obtains data such as video, audio, and images as media data, and further obtains to meta-data and messages.

In addition, the MMT-CI which describes the configuration of the screen or a change with time is also obtained by the MMT decoding unit 205. In the MMT decoding unit 205, the parsing of the MMT-CI is performed and the DOM tree of the MMT-CI is generated. The various data obtained by the MMT decoding unit 205 is supplied to the MMT player 206.

The MMT player 206 generates output data of images and audio according to the configuration (the layout) of the screen, the change with time or the like specified by the MMT-CI based on data such as video, audio, and images obtained by the MMT decoding unit 205. The output data of images and audio is supplied to the output unit 203. In the output unit 203, when the MMT screen is displayed, image display and audio output are performed based on the output data of images and audio generated by the MMT player 206.

In addition, in response to a request from the reception side, an HTML 5 document (an HTML file) for displaying a web page (an HTML 5 application) is transmitted to the reception side from the web server 130 through a communication network transmission channel such as the Internet 300. An HTML 5 document (an HTML file) that is transmitted from the web server 130 is received by the IP reception unit 201 of the receiver 200. The HTML 5 document is supplied to the web browser 202.

In the web browser 202, the HTML 5 document that is received by the IP reception unit 201 is parsed, a DOM tree is generated, and output data of images and audio is generated based on the DOM tree or the like. In the web browser 202, when generating the DOM tree, when a video (video) element which references an MMT stream is present in the HTML 5 document, the DOM tree of the MMT-CI that is generated by the MMT decoding unit 205 as described above is linked beneath the node of the video element (refer to FIGS. 8, 10, and 11).

The output data of images and audio generated by the web browser 202 is supplied to the output unit 203. In the output unit 203, when the browser screen is displayed, image display and audio output are performed based on the output data of images and audio generated by the web browser 202. Here, when a video (video) element that references the MMT stream is present in the HTML document, the MMT screen is inserted and displayed in a predetermined region of the browser screen (refer to FIG. 3).

In the web browser 202, accessing a predetermined element of the MMT-CI, acquiring and using the element are performed either according to the operation of a viewer or automatically based on the linked DOM tree. For example, displaying information relating to the presentation control of the MMT screen on the browser screen is performed based on the acquired element. In the web browser 202, for example, when a script for accessing a predetermined element of the MMT-CI is contained in the HTML document, acquiring the predetermined element of the MMT-CI is performed using the script. Note that, depending on the situation, the acquisition of a predetermined element of the HTML document is also performed.

Figure 12:
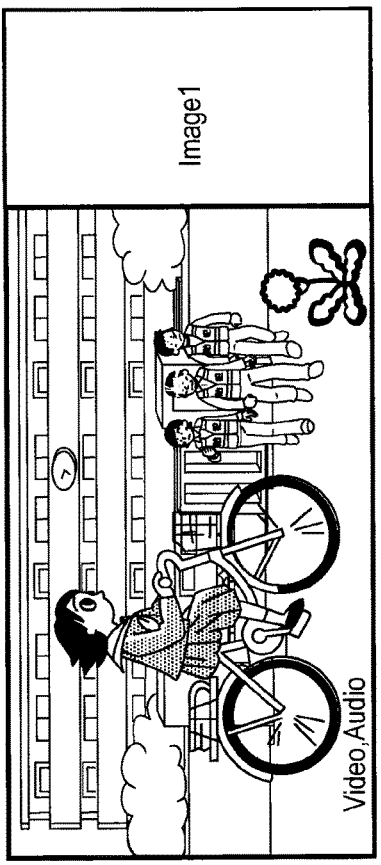
FIG. 12 is a diagram illustrating an example of a browser screen in which an MMT screen is being displayed in a partial region.

FIG. 12 illustrates an example of the browser screen. The MMT screen is inserted into a partial region of the browser screen. The display region of the MMT screen is divided into two, video (video) and audio (audio) are displayed in one region, and image 1 (Image 1) is displayed in the other region. The browser screen displays "Display time of Image 2: 18:00" in the proximity of the display region of the MMT screen.

Specific elements of the MMT-CI and the HTML document (the value "18:00" which is the value of the display end time, and the textual data indicating "Display start time of image2") that are acquired using a script contained in the HTML document of FIG. 9 described above are used, for example, for the display information. Based on this display, the viewer of the browser screen can ascertain, in advance, that image 1 (Image 1) that is displayed in the display region of the MMT screen will switch to image 2 (Image 2) when the time reaches 18:00.

As described above, in the display system 10 illustrated in FIG. 1, in the web browser 202 of the receiver 200, during the generation of the DOM tree of the HTML document, when a video element that references an MMT stream is present in the HTML document, the DOM tree that is generated according to the MMT-CI is linked beneath the node of the video element.

Therefore, for example, it is possible to access the elements of the MMT-CI from the HTML application side. For example, it is possible to display information relating to the presentation control of the MMT screen on the browser screen (the display screen of web page) based on predetermined elements of the MMT-CI that are acquired. Accordingly, the user (the viewer) can ascertain the information relating to the presentation control of the transport media presented on the browser screen.

2. Modification Example

Note that, in the embodiment described above, an example is given in which a program (a script) for accessing a specific element of the MMT-CI is contained in an HTML document that is transmitted from the web server 130 (refer to FIG. 9).

However, a configuration can be conceived in which an HTML document that is transmitted from the web server 130 contains reference information for acquiring a program (a script) for accessing a specific element of the MMT-CI. In this case, the web browser 202 acquires a script file containing a program (a script) for accessing a specific element of the MMT-CI from the web server 130 based on the reference information.

FIG. 13A illustrates an example of an HTML document in this case. Here, ""src="http://sample.mmt"" is reference information for acquiring a program (a script) for accessing a specific element of the MMT-CI. In addition, FIG. 13B illustrates an example of a script file containing the program (the script) for accessing a specific element of the MMT-CI in this case.

In addition, in the embodiment described above, an example is given in which the transport media stream is an MMT stream; however, the present technology can, naturally, be applied equally to a display system that handles a transport media stream that is similar to an MMT stream. In other words, in the embodiment described above, an example is given in which the second HTML document is an MMT-CI; however, for example, it is conceivable for this to be data having an HTML structure to which the data structure of MPEG2-TS is mapped.

In addition, in the embodiment described above, an example is given in which the streaming server 120 and the web server 130 are distinct from each other; however, a configuration in which these servers are formed of a single server is also conceivable.

In addition, in the embodiment described above, an example is given in which, as the receiver 200, the MMT decoding unit 205 and the MMT player 206 are present distinctly from the web browser 202. However, it is conceivable to provide a web browser 202 which is provided with the functions of the MMT decoding unit 205 and the MMT player 206. In this case, the MMT decoding unit 205 and the MMT player 206 are not necessary.

In addition, the present technology may adopt configurations such as the following.

(1) A reception device including a first reception unit which receives a first HTML document for displaying a web page; a second reception unit which receives a transport media stream containing a predetermined number of transport media and a second HTML document as presentation control information of the transport media; and a DOM tree generation unit which generates a DOM tree of the first HTML document that is received by the first reception unit, in which, when a video element that references the transport media stream is present in the first HTML document, the DOM tree generation unit links the DOM tree that is generated according to the second HTML document contained in the transport media stream beneath a node of the video element.

(2) The reception device according to (1) further including an element acquisition unit which acquires a predetermined element of the second HTML document based on the DOM tree that is generated by the DOM tree generation unit.

(3) The reception device according to (2) further including a display control unit which controls display of the web page based on the DOM tree that is generated by the DOM tree generation unit, in which the display control unit displays information relating to presentation control of the predetermined number of transport media on a display screen of the web page based on the predetermined element of the second HTML document that is acquired by the element acquisition unit.

(4) The reception device according to (2) or (3), in which a program for accessing a specific element of the second HTML document is contained in the first HTML document, and in which the element acquisition unit acquires the specific element of the second HTML document based on the program.

(5) The reception device according to (2) or (3), in which reference information for acquiring a program for accessing a specific element of the second HTML document is contained in the first HTML document, and in which the element acquisition unit acquires the specific element of the second HTML document based on the program that is acquired using the reference information.

(6) The reception device according to any one of (1) to (5), in which the transport media stream is a transport stream in which first transport packets containing a payload of the transport media, and second transport packets containing information relating to the transport media are time division multiplexed.

(7) The reception device according to (6), in which the transport packets are MMT packets, and in which the second HTML document is an MMT-CI.

(8) An information processing method in a reception device, including a first reception unit which receives a first HTML document for displaying a web page; and a second reception unit which receives a transport media stream containing a predetermined number of transport media and a second HTML document as presentation control information of the transport media, the method including a step of generating a DOM tree of the first HTML document that is received by the first reception unit; and a step of linking the DOM tree that is generated according to the second HTML document contained in the transport media stream beneath a node of a video element when the video element that references the transport media stream is present in the first HTML document.

(9) A transmission device including a holding portion which holds a first HTML document for displaying a web page which contains a video element that references a transport media stream containing a predetermined number of transport media and a second HTML document as presentation control information of the transport media, and which contains a program for accessing a specific element of the second HTML document or reference information for acquiring the program; and a transmission unit which transmits the first HTML document that is held.

(10) The transmission device according to (9), in which the transport media stream is a transport stream in which first transport packets containing a payload of the transport media, and second transport packets containing information relating to the transport media are time division multiplexed.

(11) The transmission device according to (10), in which the transport packets are MMT packets, and in which the second HTML document is an MMT-CI.

(12) An information processing device including a data acquisition unit which acquires a first HTML document for displaying a web page; and a DOM tree generation unit which parses the first HTML document that is acquired by the data acquisition unit and generates a DOM tree in which a plurality of elements are associated with each other, in which, when a video element that references a transport media stream containing a predetermined number of transport media and a second HTML document as presentation control information of the transport media is present in the first HTML document, the DOM tree generation unit links the DOM tree that is generated according to the second HTML document contained in the transport media stream beneath the video element.

(13) An information processing method including a data acquisition step of causing a web browser to acquire a first HTML document for displaying a web page; and a DOM tree generation step of causing the web browser to parse the first HTML document that is acquired and to generate a DOM tree in which a plurality of elements are associated with each other, in which in the DOM tree generation step, when a video element that references a transport media stream containing a predetermined number of transport media and a second HTML document as presentation control information of the transport media is present in the first HTML document, the DOM tree that is generated according to the second HTML document contained in the transport media stream is linked beneath the video element.

(14) An information processing device including a data acquisition unit which acquires first display control data containing a plurality of structural units that define information relating to display control; and a structured data generation unit which parses the first display control data that is acquired by the data acquisition unit and generates structured data in which the plurality of structural units are associated with each other, in which, when a predetermined structural unit that references a transport media stream containing a predetermined number of transport media and second display control data containing a plurality of the structural units that define presentation control information of the transport media is present in the first display control data, the structured data generation unit links the structured data that is generated according to the second display control data contained in the transport media stream beneath the predetermined structural unit.

(15) An information processing method including a data acquisition step of acquiring first display control data containing a plurality of structural units that define information relating to display control; and a structured data generation step of parsing the first display control data that is acquired and generating structured data in which the plurality of structural units are associated with each other, in which, in the structured data generation step, when a predetermined structural unit that references a transport media stream containing a predetermined number of transport media and second display control data containing a plurality of the structural units that define presentation control information of the transport media is present in the first display control data, the structured data that is generated according to the second display control data contained in the transport media stream is linked beneath the predetermined structural unit.

(16) A display system including a first transmission device which transmits a first HTML document for displaying a web page; a second transmission device which transmits a transport media stream containing a predetermined number of transport media and a second HTML document as presentation control information of the transport media; and a reception device which includes a first reception unit which receives the first HTML document that is transmitted from the first transmission device, and a second reception unit which receives the transport media stream which is transmitted from the second transmission device, in which the reception device includes a DOM tree generation unit which generates a DOM tree of the first HTML document that is received by the first reception unit, and a display control unit which controls display of the web page based on the DOM tree that is generated by the DOM tree generation unit, and in which, when a video element that references the transport media stream is present in the first HTML document, the DOM tree generation unit links the DOM tree that is generated according to the second HTML document contained in the transport media stream beneath a node of the video element.

The main characteristic of the present technology is to enable the access to elements of an MMT-CI from an HTML application side by, during the generation of a DOM tree of an HTML document (HTML application) for displaying a web page, when a video element that references the MMT stream is present, linking the DOM tree of the MMT-CI beneath a node of the video element (refer to FIG. 5).

REFERENCE SIGNS LIST

10 DISPLAY SYSTEM
110 BROADCASTING STATION
120 STREAMING SERVER
130 WEB SERVER
200 RECEIVER
201 IP RECEPTION UNIT
202 WEB BROWSER
202a HTML PARSING UNIT
202b HTML DOM PROCESSING UNIT
202c HTML LAYOUT PROCESSING UNIT
202d HTML RENDERING PROCESS UNIT
203 OUTPUT UNIT
204 IP/RF RECEPTION UNIT
205 MMT DECODING UNIT
206 MMT PLAYER
300 INTERNET

The invention claimed is:
1. A reception device, comprising:
circuitry configured to
receive a first hypertext markup language (HTML) document for displaying a web page;
receive a transport media stream containing a predetermined number of transport media and a second HTML document as presentation control information of the transport media;
generate a document object model (DOM) tree of the first HTML document; and
link, when a video element that references the transport media stream is present in the first HTML document, a DOM tree that is generated according to the second HTML document beneath a node of the video element.

2. The reception device according to claim 1, wherein the circuitry is configured to acquire a predetermined element of the second HTML document based on the generated DOM tree.

3. The reception device according to claim 2, wherein the circuitry is configured to
control display of the web page based on the generated DOM tree, and
control display of information relating to presentation control of the predetermined number of transport media on a display screen of the web page based on the predetermined element of the second HTML document.

4. The reception device according to claim 2, wherein
a program for accessing a specific element of the second HTML document is contained in the first HTML document, and
the circuitry acquires the specific element of the second HTML document based on the program.

5. The reception device according to claim 2, wherein
reference information for acquiring a program for accessing a specific element of the second HTML document is contained in the first HTML document, and
the circuitry acquires the specific element of the second HTML document based on the program that is acquired using the reference information.

6. The reception device according to claim 1, wherein
the transport media stream is a transport stream in which first transport packets containing a payload of the transport media, and second transport packets containing information relating to the transport media are time division multiplexed.

7. The reception device according to claim 6, wherein
the transport packets are MMT packets, and
the second HTML document is an MMT-CI.

8. An information processing method, the method comprising:
receiving a first hypertext markup language (HTML) document for displaying a web page;
receiving a transport media stream containing a predetermined number of transport media and a second HTML document as presentation control information of the transport media;
generating a document object model (DOM) tree of the first HTML document; and
linking, when the video element that references the transport media stream is present in the first HTML document, a DOM tree that is generated according to the second HTML document beneath a node of the video element.

9. A transmission device, comprising:
circuitry configured to
hold a first hypertext markup language (HTML) document for displaying a web page which contains a video element that references a transport media stream containing a predetermined number of transport media;
hold a second HTML document as presentation control information of the transport media, and which contains a program for accessing a specific element of the second HTML document or reference information for acquiring the program; and
transmit the first HTML document, wherein
when a video element that references the transport media stream is present in the first HTML document, a DOM tree that is generated according to the second HTML document is linked beneath a node of the video element.

10. The transmission device according to claim 9, wherein
the transport media stream is a transport stream in which first transport packets containing a payload of the transport media, and second transport packets containing information relating to the transport media are time division multiplexed.

11. The transmission device according to claim 10, wherein
the transport packets are MMT packets, and
the second HTML document is an MMT-CI.

12. An information processing device, comprising:
circuitry configured to
acquire a first hypertext markup language (HTML) document for displaying a web page;
parse the first HTML document;
generate a document object model (DOM) tree in which a plurality of elements are associated with each other; and
link, when a video element that references a transport media stream containing a predetermined number of transport media and a second HTML document as presentation control information of the transport media is present in the first HTML document, a DOM tree that is generated according to the second HTML document beneath the video element.

13. An information processing method, comprising:
acquiring a first hypertext markup language (HTML) document for displaying a web page;
parsing the first HTML document;
generating a document object model (DOM) tree in which a plurality of elements are associated with each other; and
linking, when a video element that references a transport media stream containing a predetermined number of transport media and a second HTML document as presentation control information of the transport media is present in the first HTML document, a DOM tree that is generated according to the second HTML document beneath the video element.

14. An information processing device, comprising:
circuitry configured to
acquire first display control data containing a plurality of structural units that define information relating to display control;
parse the first display control data;
generate structured data in which the plurality of structural units are associated with each other; and
link, when a predetermined structural unit that references a transport media stream containing a predetermined number of transport media and second display control data containing a plurality of the structural units that define presentation control information of the transport media is present in the first display control data, structured data that is generated according to the second display control data beneath the predetermined structural unit.

15. An information processing method, comprising:
acquiring first display control data containing a plurality of structural units that define information relating to display control;
parsing the first display control data;
generating structured data in which the plurality of structural units are associated with each other; and
linking, when a predetermined structural unit that references a transport media stream containing a predetermined number of transport media and second display control data containing a plurality of the structural units that define presentation control information of the transport media is present in the first display control data, structured data that is generated according to the second display control data beneath the predetermined structural unit.

16. The reception device according to claim 1, wherein the circuitry is further configured to receive a transport media stream containing a predetermined number of transport media and a third HTML document as presentation control information of the transport media; and link, when a video element that references the transport media stream is present in the first HTML document, a DOM tree that is generated according to the third HTML document different from the second HTML document beneath a node of the video element.

* * * * *